May 18, 1954

H. C. SIMONS 2,678,597

HEATER

Filed Feb. 28, 1950

INVENTOR.
HOMER CHARLES SIMONS
BY
*McDonald & Frago*
ATTORNEYS

May 18, 1954  H. C. SIMONS  2,678,597
HEATER
Filed Feb. 28, 1950  2 Sheets-Sheet 2
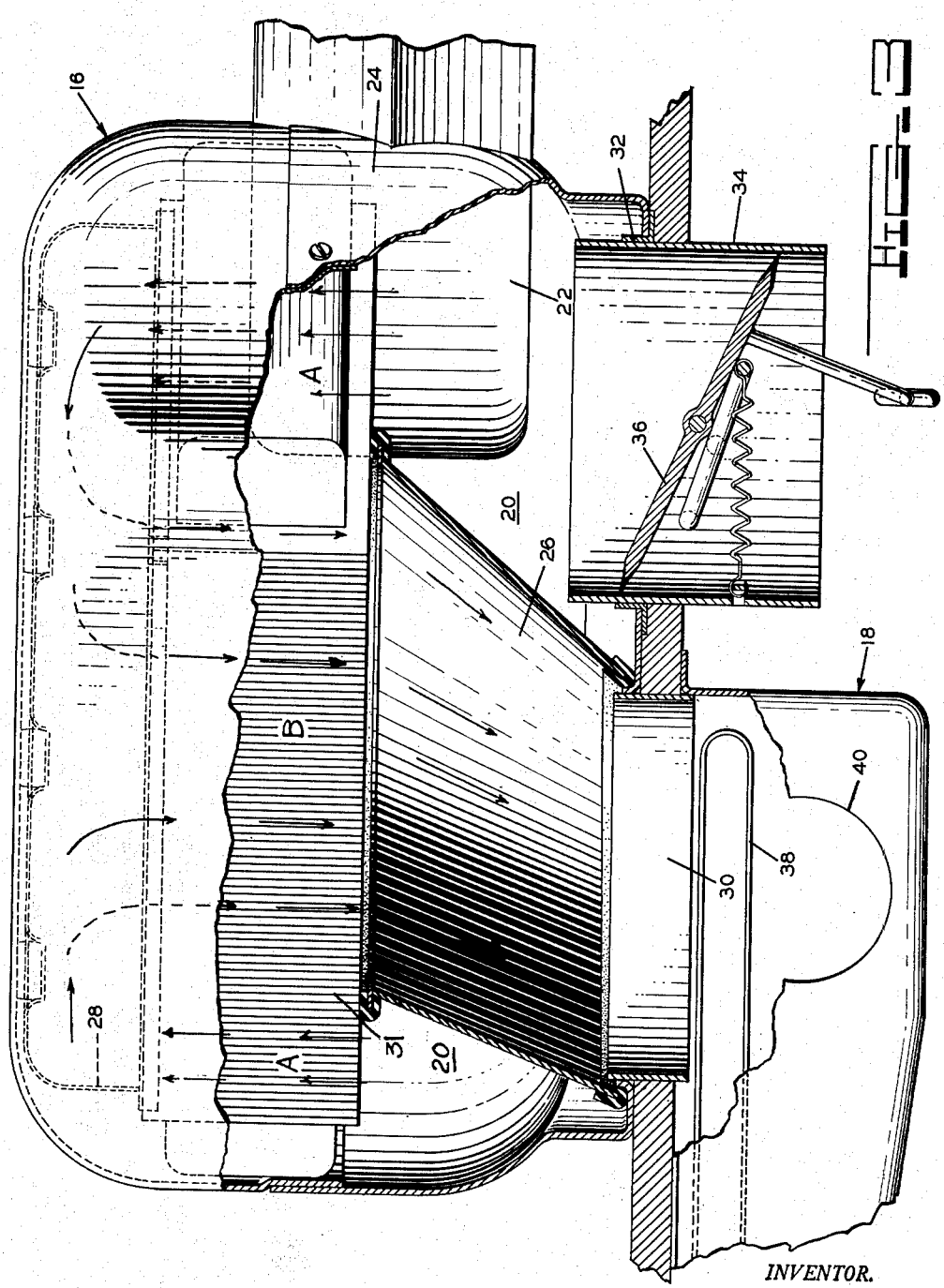
INVENTOR.
HOMER CHARLES SIMONS
BY
ATTORNEYS Patented May 18, 1954

2,678,597

UNITED STATES PATENT OFFICE 2,678,597

HEATER

Homer Charles Simons, Maple Heights, Ohio, assignor to Eaton Manufacturing Company, Cleveland, Ohio, a corporation of Ohio Application February 28, 1950, Serial No. 146,770

1 Claim. (Cl. 98—2)

This invention relates to heaters and more particularly to a combination fresh air heater and ventilator for vehicles.

Broadly the invention comprehends the provision of a combination fresh air heating and ventilating apparatus for passenger vehicles wherein the fresh air is delivered by an air impelling means to a housing per se having a heat exchanger therein for subsequent delivery in either a heated or unheated state solely dependent upon the positioning of a single manually controlled valve.

An object of the invention is the provision of a simple and economical heater and ventilator apparatus for passenger vehicles effective to supply either a direct flow of air impelled unheated fresh air or amply heated fresh air as desired.

Another object of the invention is the provision of a heating and ventilating apparatus for a vehicle including as a part thereof a fresh air receiving housing having a heat exchanger therein and a singular air valve control providing for the passage of air, either through the heat exchanger and subsequent delivery to the passenger compartment of the vehicle or directly into the passenger compartment in an unheated state.

A further object of the invention is the provision of a heating and ventilating apparatus including a housing into which fresh air is impelled for subsequent delivery therefrom, having a dual air pass heat exchanger device and a direct outlet fresh air chamber, the air discharge of both the heat exchanger device and fresh air chamber being in the same direction, said fresh air chamber discharge being valve controlled for the desired passage of fresh air therefrom either to the heat exchanger device for the heating thereof or in an unheated state directly into the passenger compartment of the vehicle.

Other objects and advantages of the invention will appear from the following description taken in connection with the drawings, forming a part of the specification; and in which:

Fig. 3 is an enlarged fragmentary partly cross-sectionalized view of the heat exchanger taken along substantially lines 3—3, Fig. 2, containing the fresh air receiving and discharging housing.

Figure 1:
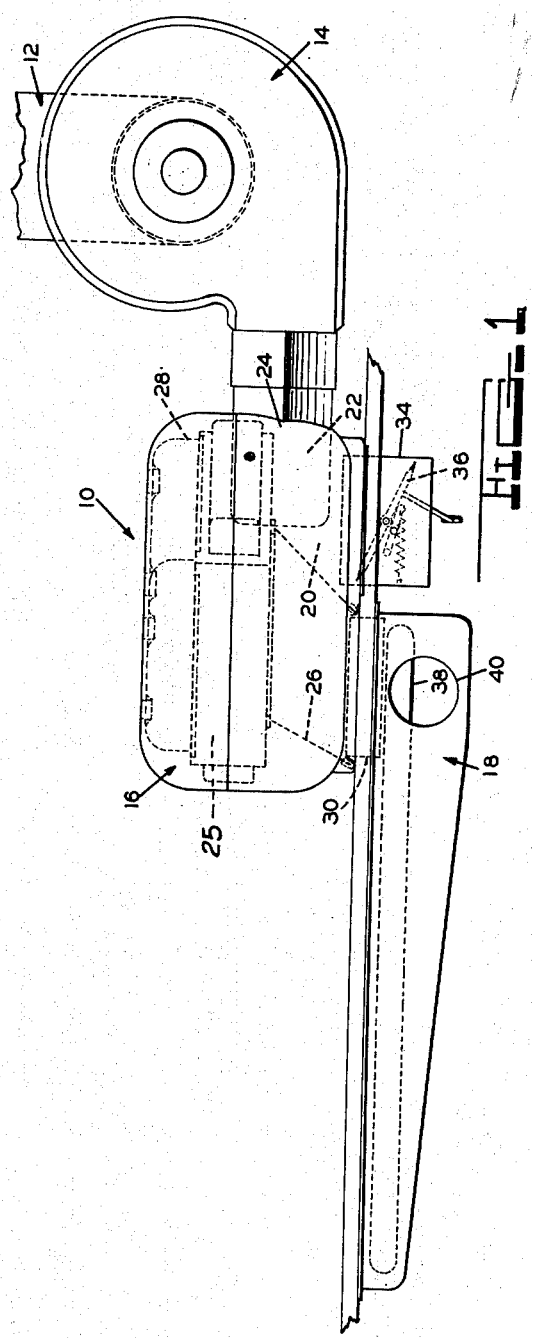
Fig. 1 is a top plan view of a combination fresh air heating and ventilating apparatus as applied to the dashboard of a vehicle.
Figure 2:
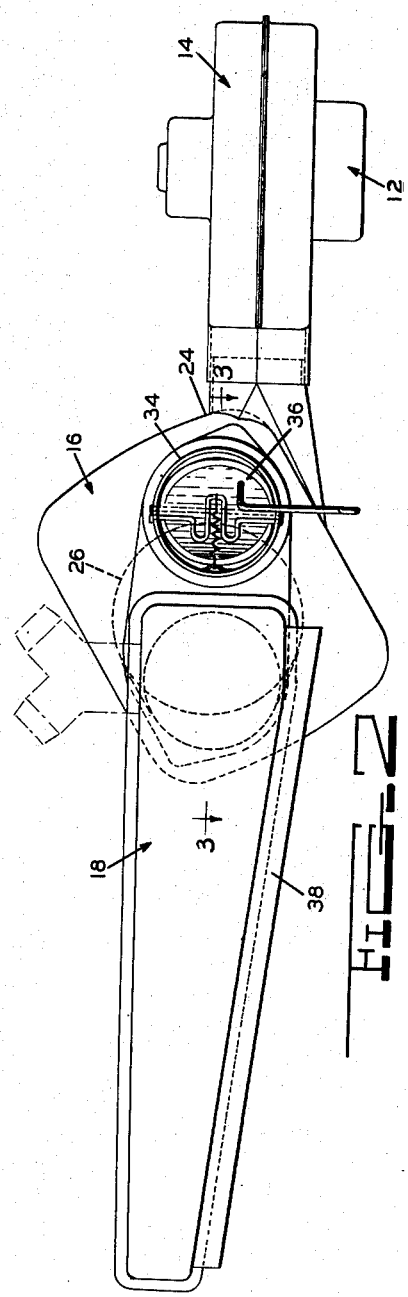
Fig. 2 is a front plan view of Fig. 1 with the dashboard removed.

The present combination heating and ventilating apparatus was devised for the purpose of providing a fairly simple, compact and economical unit for vehicle use effective to deliver either a supply of highly heated fresh air or an ample uninterrupted supply of fresh air for ventilation. These results are possible through the provision of a housing unit constituting the major element of the apparatus having a dual air pass heat exchanger device incorporated therein together with an inlet fresh air chamber having communication with the dual air pass device and valve controlled for direct fresh air discharge into the passenger compartment of a vehicle to which the apparatus is adapted, if desired. In addition to the fresh air discharge, the housing provides in the same side thereof a discharge for the air passing through the dual air pass device in heat exchange relation, said heated air discharge for better distribution of the air exiting therefrom having a discharge manifold or distributor duct arranged in communication thereon. The inlet to the housing is in direct communication with the fresh air chamber thereof and has connection with suitable fresh air ducting extending from any desirable air intake point on the vehicle. For the purpose of effectively moving an ample supply of fresh air through the air ducting from the intake thereof into discharge relation into the housing an air impeller is disposed in the ducting.

The valve at the fresh air unheated discharge point of the fresh air chamber in the housing can be manually operated to either full closed position for the delivery of all fresh air through the dual air pass device and discharge into the vehicle in a heated state or to full open position for the discharge of all fresh air directly into the passenger compartment. The latter passage of air occurs due to the fact that the discharge point thereof offers the least resistance to its normal path of flow as compared to the resistance set up in the heat exchanger device.

Referring to the drawings for more specific details of the invention 10 represents generally a combination heating and ventilating apparatus for vehicles comprising air intake ducting 12, an air impelling device 14 in the ducting, a heat exchange and fresh air ventilating housing 16 and a distributor duct 18.

The air impelling device 14 includes a blower wheel mounted therein for impelling air through the air intake ducting from any suitable location on the vehicle into the housing through suitable connection therewith, the position that the air impelling device assumes in the intake ducting being immaterial to the proper functioning of the apparatus.

The housing 16, which constitutes the heart of the apparatus, provides a fresh air chamber 20 adjacent its communication with the air impelling device by way of fresh air opening 22 thereinto in side 24 thereof and has disposed in the major portion thereof a heat exchanger 25 arranged with suitable air channel and deflector ducting 26 and 28 respectively to provide for the dual air path passage of fresh air through the heat exchanger. The air entering fresh air chamber 20 is as designated by the arrows free to pass first through one section of the heat exchanger, that is through zones A thereof, and is deflected by deflector ducting 28 for passage in the opposite direction through another portion zone B of the heat exchanger for eventual discharge through channel ducting 26 and housing outlet 30 into the distributor duct 18 communicating in air discharge relation thereto. Zone A is not shrouded or separated from zone B by any means other than because of the cellular structure of the core wherein air passages 31 run parallel to one another in the direction between the air chamber 20 and chamber in ducting 28 and exists only because of the arrangement of ducting 26 and 28 in related association therewith. Reference is had to co-pending application Ser. No. 777,507, of V. Matulaitis for a more detailed explanation of a device of similar structure for dual path air passage.

The air delivered to fresh air chamber 20 can, under different conditions, either flow through the heat exchanger or directly from said chamber by way of outlet opening 32 in the housing communicating with the chamber and a short tube 34 into the passenger compartment of the vehicle. A gate valve 36 is pivotally arranged in the opening in the tube moveable to open or close the passage through the tube and either permit the free flow of air for discharge from the fresh air chamber by way of the tube when the passage in the tube is closed or cause the air to be diverted from the passage out of the tube when the valve closes the passage therethrough with the result that it must flow through the heat exchanger for the heating thereof. The air is made to pass through the tube when the passage therein is open solely because of the greater resistance offered to its flow through the heat exchanger such that only fresh unheated air is delivered to the passenger compartment under these conditions of operation.

It is to be further noted in view of the disposition of the air impelling device in the intake ducting that the fresh air in either state of being heated or unheated is effectively propelled into the passenger compartment by the air impelling device.

Because of the compact arrangement of the housing in relation to its function, it is possible, as shown by Fig. 1, to mount the housing, intake ducting and air impelling device on the engine side of the device with solely the discharge ends of the housing extending into communication with the passenger compartment.

The distributor duct although effective for the proper distribution of heated air into the passenger compartment by way of opening 38 disposed in the bottom thereof and opening 40 in the top thereof for the appropriate attachment of windshield defroster ducting can be dispensed with if the discharge of heated air from the housing through the opening therein meets the heating requirements desired.

While this invention has been described in connection with certain specific embodiments, the principle involved is susceptible of numerous other applications that will readily occur to persons skilled in the art. The invention, therefore, is limited only as indicated by the scope of the appended claim.

What I claim is:

A vehicle heater comprising a housing having a fresh air inlet opening in one wall thereof, and side by side respective heated and unheated fresh air outlet openings in a substantially adjacent perpendicular wall of the housing, said unheated fresh air outlet opening lying in adjacent relation with the fresh air inlet opening near the junction of the aforementioned housing walls, a heat exchange core mounted in the housing disposed away from the openings in the housing, ducting extending from air conveying relation between a portion of one face of the core and the heated fresh air outlet opening, an air chamber enclosure covering the entire opposite face of the core, said exposed portion of the core having air communicating relation with the inlet opening in the housing, and said exposed face of the core lying in a plane parallel to the wall of the housing having the outlet openings therein, a short tubular duct connected to the unheated fresh air outlet opening and an air flow control valve mounted for movement entirely within the tubular duct.

References Cited in the file of this patent

UNITED STATES PATENTS

| Number | Name | Date |
|---|---|---|
| 1,759,001 | Cherry et al. | May 20, 1930 |
| 1,853,333 | Bates | Apr. 12, 1932 |
| 2,295,750 | Norris et al. | Sept. 15, 1942 |
| 2,304,642 | Hans | Dec. 8, 1942 |
| 2,342,901 | Schutt et al. | Feb. 29, 1944 |
| 2,391,408 | Galamb et al. | Dec. 25, 1945 |
| 2,488,278 | Findley | Nov. 15, 1949 |